United States Patent [19]

Bator

[11] Patent Number: 5,388,664
[45] Date of Patent: Feb. 14, 1995

[54] PORTABLE TREE STAND

[76] Inventor: Eugene A. Bator, 3887 Jones Rd., Diamond, Ohio 44412

[21] Appl. No.: 157,387

[22] Filed: Nov. 23, 1993

[51] Int. Cl.⁶ ............................................... E06C 1/00
[52] U.S. Cl. ................................. 182/100; 182/206; 182/92
[58] Field of Search ............... 182/100, 189, 206, 187, 182/188, 133–136, 92, 116

[56] References Cited

U.S. PATENT DOCUMENTS

| | | | |
|---|---|---|---|
| 917,805 | 4/1909 | Shaw | 182/134 |
| 1,918,293 | 7/1933 | Seiler | 182/134 |
| 2,833,333 | 5/1958 | Babineau . | |
| 3,630,314 | 12/1971 | Bamburg . | |
| 4,061,202 | 12/1977 | Campbell | 182/187 X |
| 4,205,733 | 6/1980 | Wade . | |
| 4,257,490 | 3/1981 | Bandy . | |
| 4,301,891 | 11/1981 | Harbian | 182/136 X |
| 4,310,070 | 1/1982 | Mastrogianais | 182/189 X |
| 4,368,800 | 1/1983 | Champbell . | |
| 4,399,973 | 8/1983 | Spry et al. . | |
| 4,411,335 | 10/1983 | Forrester . | |
| 4,427,092 | 1/1984 | Tentler . | |
| 4,428,459 | 1/1984 | Peck . | |
| 4,552,247 | 11/1985 | Purdy . | |
| 4,694,934 | 9/1987 | Erickson . | |
| 4,722,240 | 2/1988 | Arthurs et al. . | |
| 4,754,841 | 7/1988 | Koffski . | |
| 4,989,766 | 2/1991 | Lewallyn et al. . | |
| 5,009,285 | 4/1991 | Ramsey . | |
| 5,016,732 | 5/1991 | Dunn . | |
| 5,016,733 | 5/1991 | Bradley . | |
| 5,040,635 | 8/1991 | Strickland . | |
| 5,060,756 | 10/1991 | D'Acquisto . | |
| 5,105,908 | 4/1992 | Freund . | |
| 5,109,954 | 5/1992 | Skyba . | |

FOREIGN PATENT DOCUMENTS

1483752 6/1967 France .................. 182/134

Primary Examiner—Alvin C. Chin-Shue
Attorney, Agent, or Firm—Calfee, Halter & Griswold

[57] ABSTRACT

A portable tree stand is provided for use by a person to climb to and descend from an elevated position next to an upright object. The stand comprises a pole, a clamping assembly attached to the pole near its top end for securing the pole to the upright object, a device on the bottom end of the pole for anchoring it to the ground and upper and lower foot supports for use by the person to climb and descend the pole. Each foot support is slidably mounted on the pole but has a friction device that locks the foot support in a fixed position on the pole in response to a downwardly applied force.

17 Claims, 7 Drawing Sheets

PORTABLE TREE STAND

FIELD OF THE INVENTION

This invention relates to apparatus used by hunters, photographers and naturalists to climb to elevated positions next to tree trunks or other upright objects and to sit in those elevated positions. In particular, the invention relates to the type of climbing apparatus designed to be carried by a user walking on foot to the site where he intends to erect it. Such devices are often known by hunters as "portable tree stands."

BACKGROUND OF THE INVENTION

From the perspective of a hunter, photographer or naturalist, a portable tree stand should be a light-weight device that can be easily carried for long distances over rough terrain, and easily erected and safely secured to a tree trunk or similar upright object, even in the dark. Also, the tree stand should have a seat that allows the user to sit safely and comfortably for several hours. Should the need arise, the user should be able to disassemble the stand and move it to another location quickly. For deer hunting in particular, the ability to move the stand quickly to new locations is very important and sometimes it is critical for the hunter to be able to move his stand quickly by a distance of only a few yards. Furthermore, the stand should be capable of being secured to a tree trunk in such a manner that, after it is disassembled and removed, no signs remain that would be detectable by wildlife or other persons. The portable tree stand should also be adaptable to be secured to the trunk of a tree of a wide variety of types, shapes and locations. In addition, the tree stand should be capable of being easily ascended and sat upon.

Portable tree stands fall into four general categories. One category consists of collapsible ladders, with platforms at their top ends that fasten to the tree trunk. Examples of the ladder stands are shown in U.S. Pat. Nos. 3,630,314; 4,552,247; and 5,105,908. The main disadvantage of ladder stands is that they are heavy and bulky, making them difficult to carry. They are also prone to catching on branches and other forest clutter and are noisy when they are disassembled, moved and reassembled. Furthermore, they require, for stable placement, a tree that is relatively thick, preferably 12 to 18 inches in diameter at the place where the platform at the top of the ladder is to be connected, in order to enable the ladder to resist the twisting movement of the user's weight. Alternatively, the ladder type of stand should be secured to a tree with a double trunk.

Another type of portable tree stand is the climber stand. A climber stand comprises a U-shaped arm that wraps around the tree trunk and is pivoted to platform with a wedge-shaped end that engages the trunk below the arm. The weight of the platform and, at some times, the user's weight on the platform causes the platform to press against one side of the trunk while the pivoted arm engaging the other side of the trunk prevents the end of the platform away from the trunk from falling downward. The stand can be moved by the user holding onto the trunk with either pair of limbs, either his arms or legs, while he disengages the wedged platform with his other pair of limbs and moves the stand up or down the trunk. In some cases, two stands are used, and the user moves one stand while hanging on to the other stand. Examples of climber stands are shown in U.S. Pat. Nos. 4,427,092; 4,989,766; and 5,016,733. Climber stands are generally heavy and bulky, because they have cantilevered support members that must be sturdy enough to support the users who is climb on them. They also require very straight, vertical tree trunks of 10 to 18 inches in diameter. Furthermore, the user must be strong and very athletic in order to climb quickly up and down trees using a climber stand. In addition, a climber stand tends to be noisy while the user is climbing on it and it can be dangerous if the user does not hang or sit on it properly.

Another type of tree stand is the clamp-on stand. Many of these stands are of construction similar to the climber stand. However, the clamp-on stands are secured more permanently to the tree trunk and are not designed for use in climbing the tree. Examples are shown in U.S. Pat. Nos. 4,411,335 and 5,060,756. The clamp-on stands are generally lighter in weight and less bulky than the climber stands. However, because the user must carry additional apparatus for climbing the tree, the total package is usually heavier and more bulky than a climber stand. In addition, the clamp-on stands tend to be more difficult to attach and remove from trees, making them less useful as portable devices.

The fourth type of portable tree stand is the single pole stand. This stand comprises a long upright pole with steps protruding from its sides. The top of the pole is equipped with an clamping assembly for securing it to a tree trunk. For storage purposes, the pole is divisible into sections and the steps are usually removable. Some single pole stands are climbing devices only and have no means for the user sitting on them. They are usually intended for use with a clamp-on stand, as shown in U.S. Pat. Nos. 4,411,335; 5,040,635; and 5,109,954. Others are equipped with seats, as shown in U.S. Pat. Nos. 4,257,490 and 4,592,446. All of these stands are heavy and cumbersome to carry because of the many steps that protrude from them. Those that have removable steps are less cumbersome to carry, but they are more difficult to assemble, particularly at night. The pole stands with no seats are cumbersome because additional seats must be carried with them and attached separately to the tree trunk. The stands that do have seats have heavy and cumbersome systems for securing them to the tree trunks.

In the building industry, various climbing devices are used for mounting scaffolds, such as the portable step shown in U.S. Pat. No. 4,754,841. However, such steps rely on sharp prongs for their attachment and are designed for use with wooden posts of uniform size that can withstand the biting engagement of prongs. In contrast, a portable tree stand must be designed for climbing irregular tree trunks that would be damaged by the repeated piercing of prongs.

SUMMARY OF THE INVENTION

The object of the present invention is to provide a portable tree stand that overcomes the deficiencies of the stands described above and satisfies the user's need for a stand that is light weight, easily carried, easily and quickly assembled and disassembled, easily and safely secured to a tree trunk for extended seating by the user, does not leave behind detectable signs of its use, can be secured to trees of a wide variety of shapes, sizes and locations, and can be easily ascended and sat upon.

These and other objects are accomplished by an apparatus that comprises a pole, a clamping assembly for securing the top end of the pole to a tree trunk or other upright object, a spike at the bottom end of the pole for inserting the bottom end into the ground and upper and lower foot supports for use by the user to climb up and descend down the pole. Preferably, each foot support has a sleeve slidably mounted on the pole and a foot platform extending from one side of the sleeve. The sleeve of the upper foot support is mounted on the pole above the sleeve of the lower foot support. Each sleeve has upper and lower friction pads on its interior surface facing the pole, with the upper friction pad located on the side of the sleeve opposite from the foot platform and the lower friction pad located on the same side of the sleeve as the foot platform. The upper and lower friction pads engage the pole in response to a downward force on the foot platform. Hand straps are connected to the side of each foot support on which the foot platform is located, for pulling up on the foot support to disengage the friction pads from the pole and allow the sleeve to slide on the pole.

Preferably, the clamping assembly comprises two arms that extend outwardly from the pole and are mounted on the pole rotatably about an axis substantially parallel to the pole. A tine extends from the distal end of each arm in a direction substantially perpendicular to the pole and toward the prong on the other arm. A rope is secured at one end to one of the arms at a location between the pole and the distal end of the arm and the rope is slidably connected to the other arm at a location between its distal end and the pole. When the rope is pulled, the arms are rotated toward each other, causing their tines to come together and secure the pole to a tree trunk or other upright object located in the enclosure formed by the arms, the tines and the portion of the rope extending between the arms.

Preferably, the pole is divided into detachable sections and the arms are also rotatable about axes substantially perpendicular to the pole so that they can be rotated to positions parallel to the pole, for storage or carrying purposes.

These and other objects, features and advantages of the invention will be more apparent from the following description of the invention and attached drawings.

DETAILED DESCRIPTION OF THE INVENTION

Figure 1:
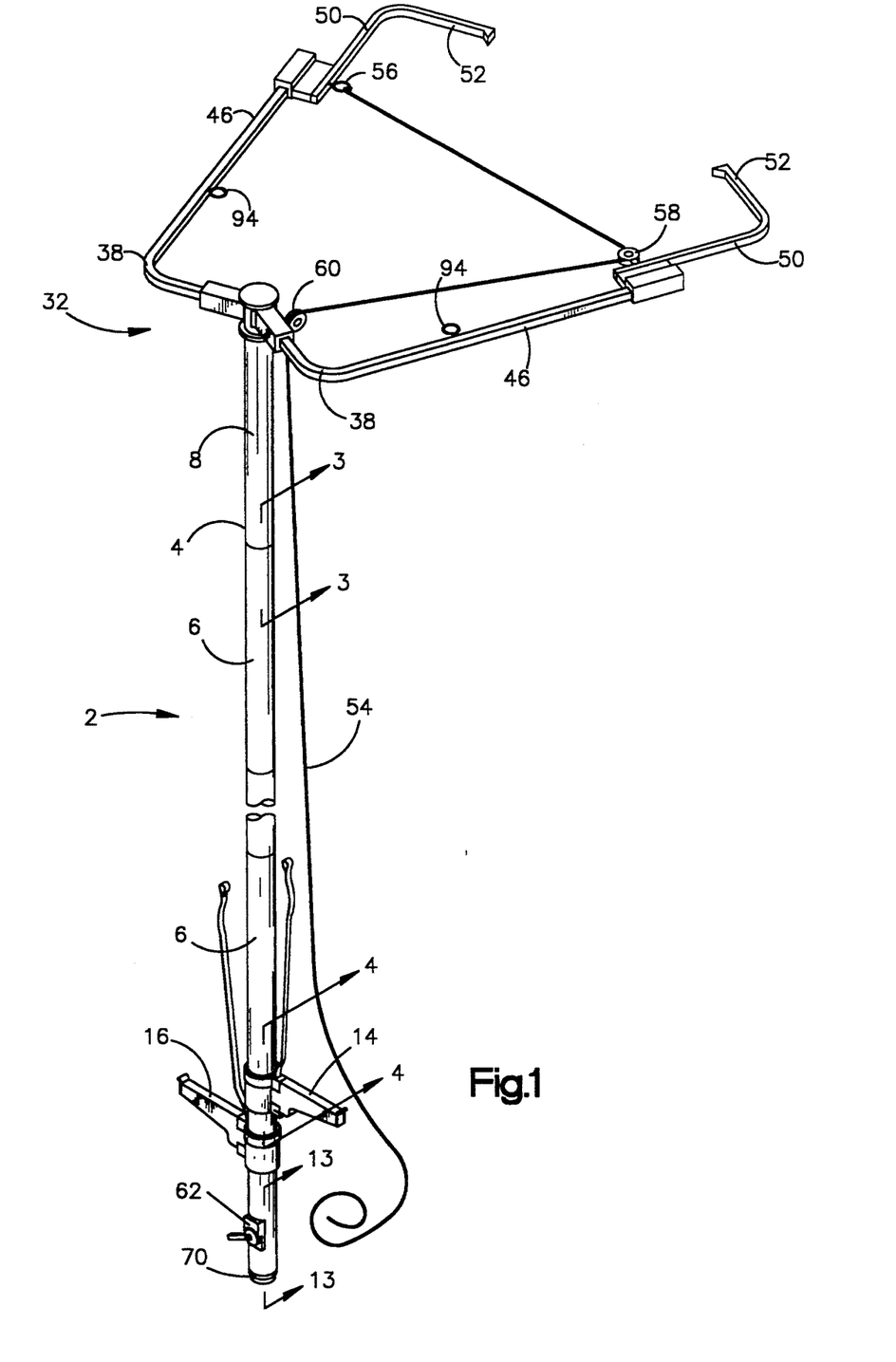
FIG. 1 is a perspective view of a portable tree stand fully assembled and laying on its side, illustrating one embodiment of the present invention.

Referring to FIG. 1, a portable tree stand 2 includes a pole 4 divided into a plurality of lower sections 6 (five in the illustrated embodiment) and a top section 8. Each section 6 and 8 is preferably a tube of 1.75 inches (4.5 cm.) diameter and a wall thickness of 0.065 inch (1.65 mm.). For light weight and strength, the sections 6 and 8 are preferably made of a high strength aluminum alloy of the kind used in the aircraft industry. As shown in the disassembled view of the pole 4 in FIG. 2 and the detail view of FIG. 3, each section 6 has a narrowed neck 10 at its top end and a bottom end with a preferably reamed opening 12, designed for a sliding, frictional fit with the neck 10 of another section 6. The top section 8 of the pole 4 also has a bottom end with a preferably reamed opening 12, but no narrowed neck 10 at its top end. The lengths of the pole sections 6 and 8 are preferably between 24 and 30 inches (60 to 75 cm.), so that they fit into a backpack extending from the tops of the shoulders to the bottom of the rear end of an average hunter or other user. For the purpose of this description, the user of the portable tree stand 2 will be referred to as a hunter, although the reader should appreciate the fact that this invention may be used by many others for a variety of purposes.

A pair of upper and lower foot supports 14 and 16 are slidably mounted on the pole 2 of FIG. 1. As shown in the cross-sectional drawing of FIG. 4, each of these foot supports has a plastic sleeve 18 slidably mounted on the pole 4 and an aluminum foot platform 20. The foot platform 20 is mounted on the sleeve 18 by means of aluminum blocks 22 and a thin, high tensile steel strap 24 wrapped around the sleeve 18 and attached to the upper block 22. When the hunter steps on the platform 20, the strap 24 transmits the load from the platform 20 to the sleeve 18 in a manner that prevents torsional distortion of the sleeve 18. The plastic sleeve 18 has an inside diameter slightly larger than the outside diameter of the pole 4, to permit easy sliding of the foot supports 14 and 16 on the pole 4. An upper friction pad 26 and a lower friction pad 28 are secured to pockets in the inside surface of the sleeve 18. These pads are made of a high coeficient of friction material such as urethane and fiber laminate. As shown in the detail view of FIG. 4, the upper friction pad 26 is located near the upper end of the sleeve 18 on the side of the sleeve away from the foot platform 20. The lower friction pad 28 is located near the lower end of the sleeve 18 on the same side of the sleeve 18 as the foot platform 20. When the hunter steps on the foot platform 20, the friction pads 26 and 28 engage the pole 4 and prevent the sleeve 18 from sliding on the pole 4.

Figure 2:
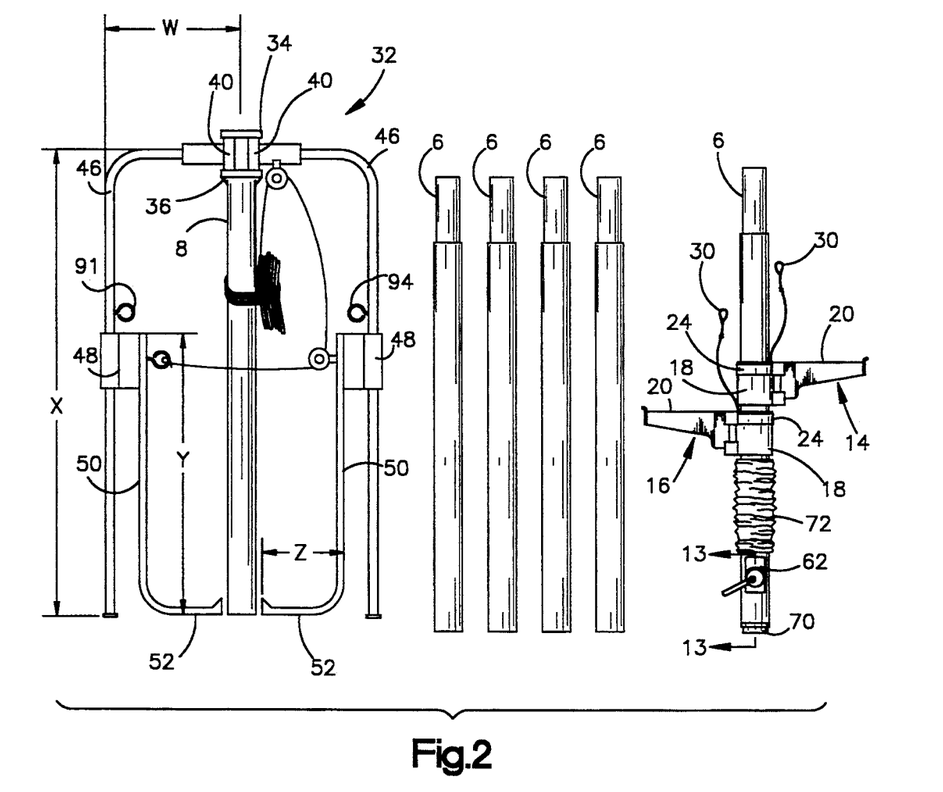
FIG. 2 is a view of the portable tree stand of FIG. 1 with its parts disassembled and positioned for storage or carrying purposes.
Figure 3:
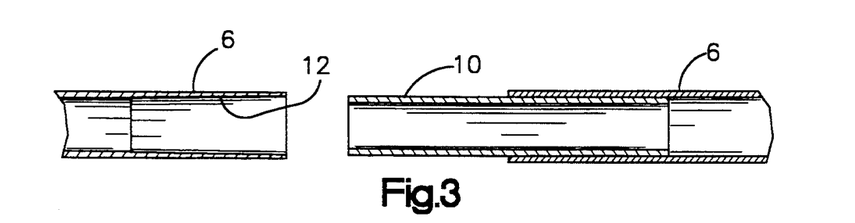
FIG. 3 is an enlarged, cross-sectional view of a portion of the tree stand of FIG. 1, taken along line 3—3 of FIG. 1.

As shown in FIG. 2, when the tree stand 2 is disassembled for storage or transport, the foot supports 14 and 16 are slid onto the lowest section 6 of the pole 4.

Figure 4:
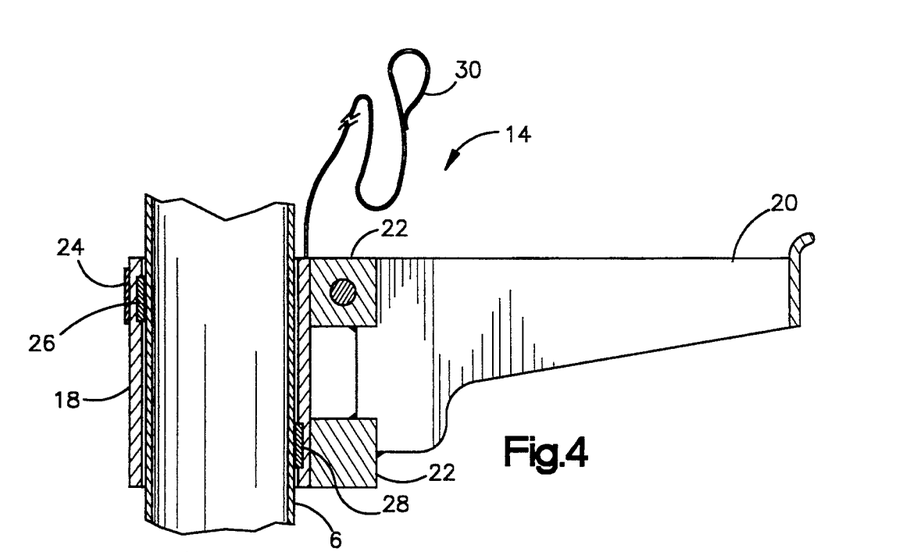
FIG. 4 is another enlarged, cross-sectional view of a portion of the tree stand of FIG. 1, taken along line 4—4 of FIG. 1.

As shown in FIGS. 1, 2 and 4, a strap 30 is connected to the upper end of each sleeve 18 of the foot supports 14 and 16, on the same side of the sleeve as the foot platform 20. Each strap is approximately five feet (150 cm.) in length and is provided to allow the hunter to pull by hand upwardly on the sleeve 18 to disengage the friction pads 26 and 28, so that the foot supports 14 and 16 may be raised or lowered when the hunter is climbing or descending the pole 4. Alternatively, foot straps similar to those used on bicycle pedals may be attached to the foot platforms 20 of the supports 14 and 16, so that the hunter can raise and lower the supports with his feet rather than with his hands.

Figure 5:
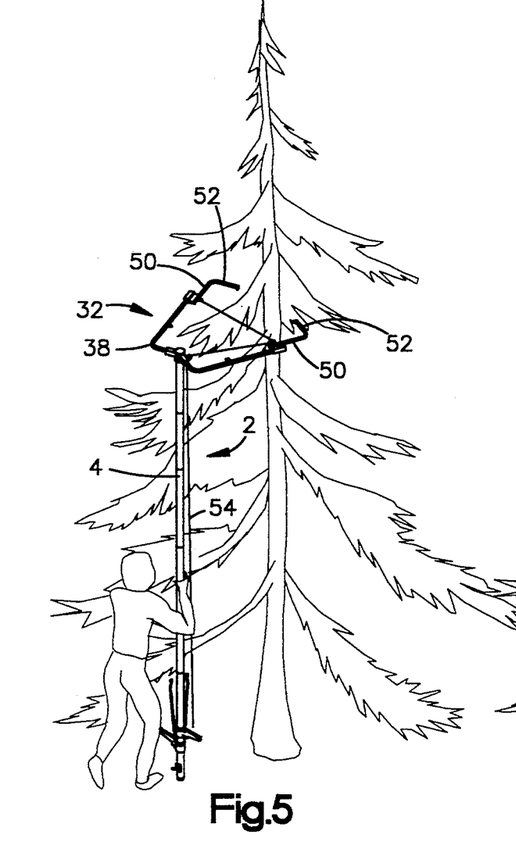
FIG. 5 is a perspective view of the portable tree stand of FIG. 1, being positioned next to a tree trunk by a user.
Figure 6:
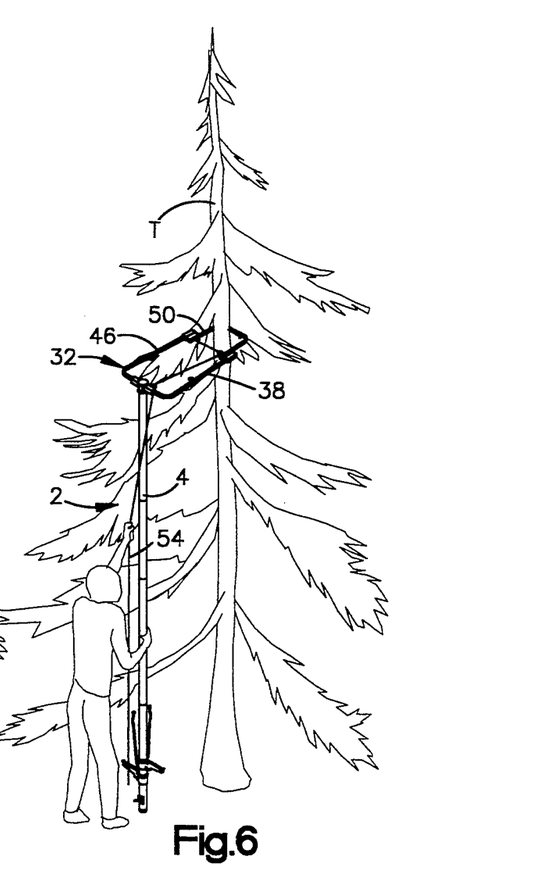
FIG. 6 is a perspective view of the portable tree stand of FIG. 1, similar to the view of FIG. 5 but showing the user securing the top of the tree stand to a tree trunk.
Figure 7:
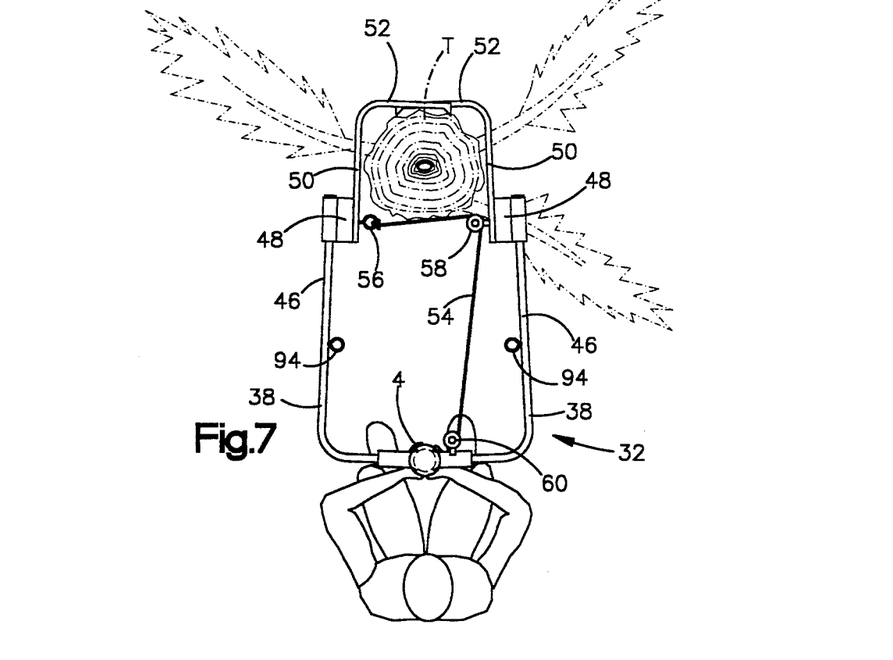
FIG. 7 is a top view of the portable tree stand of FIG. 1, in a postition of being secured to a tree trunk by a user.

As shown in FIGS. 1, and 5 through 10, a clamping assembly 32 is attached to the top of the pole 4, for securing the top of the tree stand 2 to a tree trunk T (FIGS. 5–7). The clamping assembly 32 includes upper and lower collars 34 and 36 secured to the top section 8 of pole 4 (FIGS. 8 and 9) and arms 38. The arms 38 are rotatably held within the collars 34 and 36 by flanges 40 attached to the ends of the arms 38. The collars 34 and 36 allow the arms 38 to be rotated with about an axis substantially parallel to the pole 4. Preferably, an elastic tension band 42 (FIG. 10) is connected between the rearward ends of the flanges 40 to hold the arms 38 rotated in spread apart positions while the hunter is positioning the tree stand 2 next to a tree trunk (FIG. 5).

Figure 8:
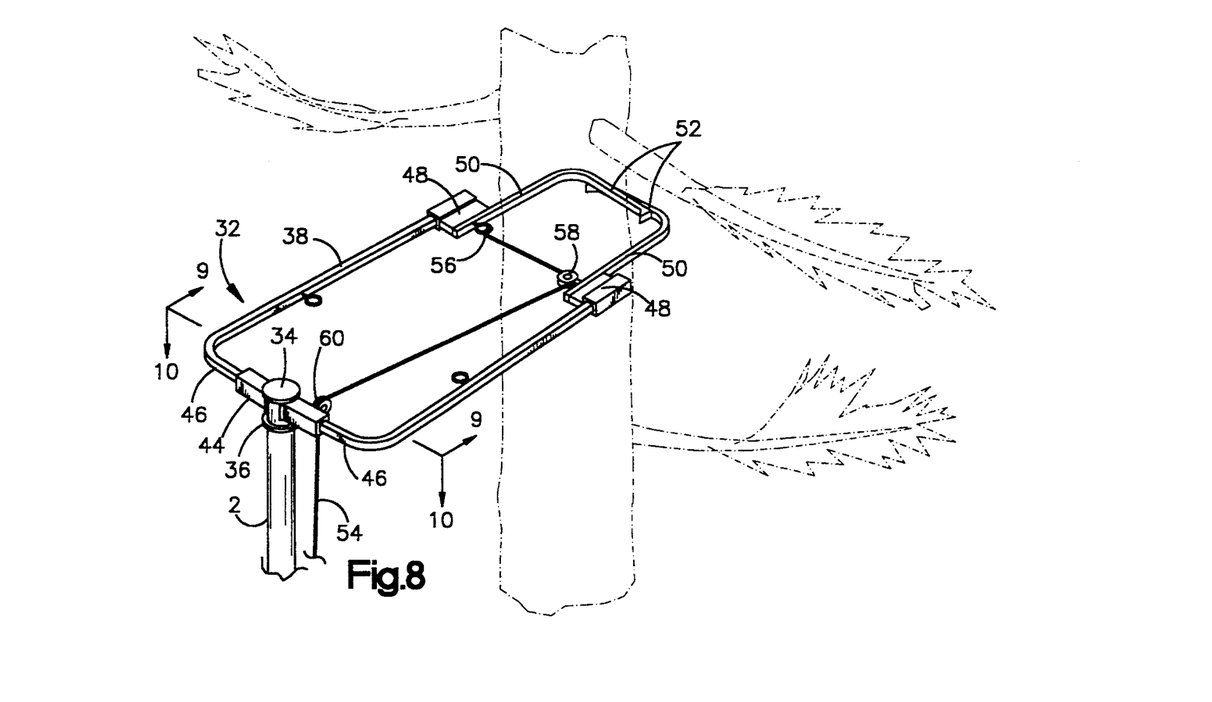
FIG. 8 is an enlarged view of the top portion of the tree stand of FIG. 1, in a position of being secured to a tree trunk by a user.
Figure 9:
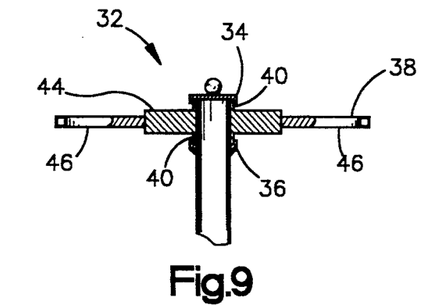
FIG. 9 is an enlarged cross sectional view of a portion of the tree stand of FIGS. 1, 5 and 8, taken along line 9—9 of FIG. 8.
Figure 10:
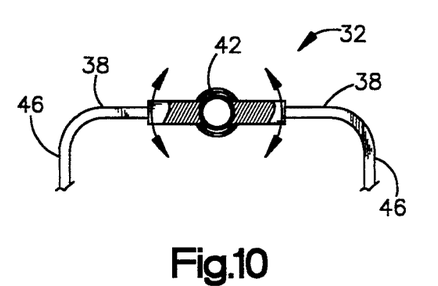
FIG. 10 is an enlarged cross sectional view of a portion of the tree stand of FIGS. 1, 5 and 8, taken along line 10—10 of FIG. 8.

As shown in FIG. 8, each of the arms 38 of the clamping assembly 32 include sleeve sections 44, L-shaped inner rod sections 46, slide members 48 and outer rod sections 50 with tines 52. Preferably, these parts of the arms 38 are coated with a compressible, pliable material, such as polyurethane foam, which allows the arms 38 to grip a tree trunk more securely and also protects the surfaces of the trunk from damage. The inner rod sections 46 are held in slidable, friction fits within the sleeve sections 44, so that the arms 38 can be rotated about axes perpendicular to the pole 4 to positions parallel to the pole 4 (FIG. 2), for storage and carrying purposes. The slide members 48 are fixed to the outer rod sections 50 and have holes that engage the inner rod section in a slidable, friction fit, so that the arms 38 can be telescoped for storage or carrying purposes, as shown in FIG. 2. Preferably, the parts of the arms 38 are dimensioned so that they can be secured to tree trunks as large as 24 inches (61 cm.) in diameter. Suitable dimensions would be, for the L-shaped inner rod sections 46, a dimension W (FIG. 2) of 8 inches (20.3 cm.) and a dimension X of 27 inches (68.6 cm.) and for the outer rod sections 50, a dimension Y of 22 inches (55.9 cm.) and a dimension Z of 6 inches (15.2 cm.).

A rope 54 (FIGS. 1 and 5–7) is secured to an eyelet 56 attached to one of the arms 38, preferably at its slide member 48. The rope 54 is also passed around a pulley 58 attached to the other arm 38, preferably at its slide member 48. From the pulley 58, the rope 54 is preferably passed around a pulley 60 attached to one of the sleeve sections 44. When the hunter raises the pole 4 to the vertical position shown in FIG. 5, the rope 54 depends downwardly to the bottom of the pole 4. By pulling on the end of the rope 54, the hunter is able to rotate the arms 38 toward each other to secure them to a tree trunk, before he climbs up the pole 4. When the hunter pulls on the rope 54 to rotate the arms 38 together with the tree trunk T located in the enclosure formed by the overlapping tines 52, the outer rod sections 50 of arms 38 and the portion of the rope 54 extending between the arms 38, as shown in FIG. 6, the top of the pole 4 becomes securely attached to the tree trunk T.

Figure 11:
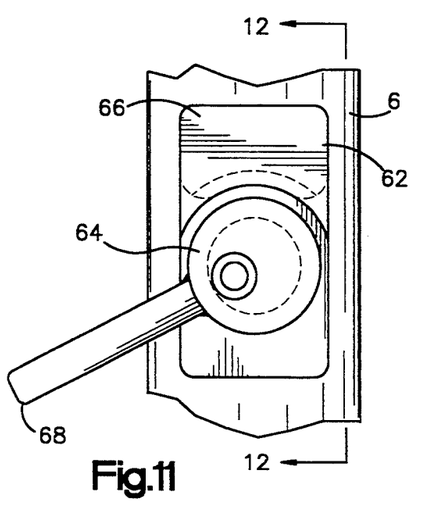
FIG. 11 is an enlarged view of another portion of the tree stand of FIG. 1.
Figure 12:
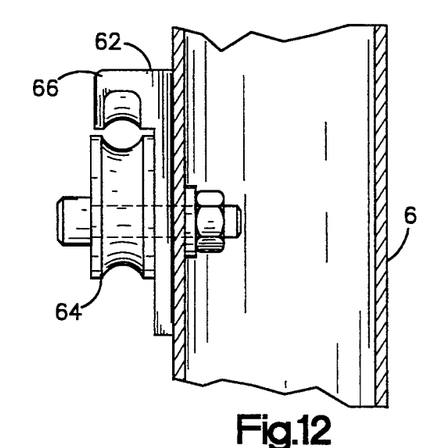
FIG. 12 is a cross sectional view of the portion of the tree stand shown in FIG. 11, taken along line 12—12 of FIG. 11.

To enable the hunter to secure the bottom end of the rope 54 to the pole 4, the bottom section 6 of the pole 4 is preferably equipped with a rope clamp 62, shown in FIG. 2 and in detail in FIGS. 11 and 12. As best shown in FIGS. 11 and 12, the rope 54 is passed between an eccentrically mounted cam wheel 64 and an arcuate abutment 66. When the hunter has pulled the rope 54 to the desired tension to secure the clamping assembly 32 to the tree trunk T, he rotates the handle 68 (FIG. 11) on the cam wheel 64 in a counter-clockwise direction to squeeze the rope 54 against the abutment 66 and thus hold the arms 38 firmly wrapped around the trunk T.

Figure 13:
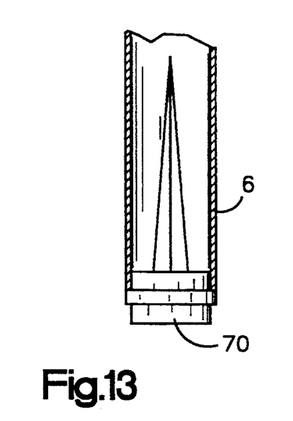
FIGS. 13 and 14 are enlarged sectional views of yet another portion of the portable tree stand of FIGS. 1 and 2, taken along line 13—13 of FIGS. 1 and 2.
Figure 14:
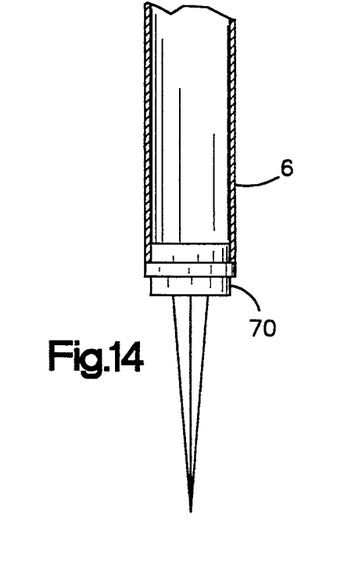

While the clamping assembly 32 is being secured to the tree trunk T, the bottom end of the pole 4 should be securely anchored to the ground. For that purpose, a spike 70 is attached to the free end of the bottom pole section 6, as shown in the detail drawing of FIG. 13. When the tree stand 2 is being stored or transported, the spike 70 is turned around and inserted in end of the bottom pole section 6 as shown in FIG. 14.

Preferably, so that forest wildlife and other persons will be unlikely to notice the tree stand 2 once the hunter has climbed into it, a telescopable sock 72 made of camouflage material is attached between the bottom of the sleeve 18 of the lower foot support 16 and the top of the rope clamp 62 (FIG. 2). The sock should be expandable to a length almost as long as the pole 4. As the hunter climbs up the pole 4, raising the foot supports 14 and 16 to higher positions, the top end of the sock 72 attached to the support 16 is carried up the pole 4. Thus, when the hunter has reached the top of the pole 4, the sock 72 will cover almost the entire length of the pole, hiding the naturally shiny aluminum surface of the pole. When the hunter descends, the sock 72 is telescoped back to its original storage position. While it is stored, the sock 72 tends to become very wrinkled, adding to its camouflaging properties when it is again expanded.

Figure 15:
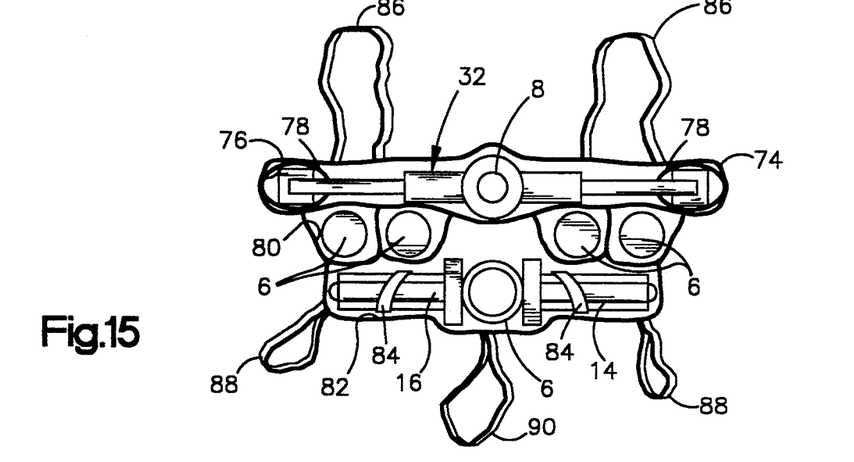
FIG. 15 is a top view of the disassembled parts of the tree stand shown in FIG. 2, arranged for carrying in a backpack.

When the portable tree stand 2 is being stored or carried its parts are preferably carried in a backpack 74, arranged in three layers as shown in the top view of the backpack 74 in FIG. 15. The first layer, closest to the hunter's back, comprises a pocket 76 and associated velcro attachment straps 78 that hold the top section 8 of the pole 4, with its connected clamping assembly 32, collapsed as shown in FIG. 2, as well as the rope 54. Because of their shape, the pole section 8 and clamping assembly 32 act as a good frame for the backpack 74. The second layer comprises four tubular pockets 80 that hold all of the sections 6 of the pole 4, except the bottom section 6. The third layer comprises a pocket 82 and velcro attachment straps 84, which cover and hold the bottom pole section 6, the attached foot supports 14 and 16, rope clamp 62, sock 72 and spike 70. Conventional backpack straps 86 (FIG. 15) connected to the front of the backpack 74 loop over the hunter's shoulders when he is carrying the backpack. The backpack 74 is also equipped with two snap action clips 88 that are sewn to its top rear corners (FIG. 15). A loop strap 90, made of heavy cloth similar to the cloth of the other components of the backpack 74, is sewn to the outside of the rear cover 92 of the backpack, preferably in the middle of the lower portion of the cover. The clips 88 and loop strap 90 enable the backpack 74 to form a sling type seat for the hunter between the arms 38 of the clamping assembly 32, after the hunter has climbed the pole 4 and is ready to sit at the top of the tree stand 2. Eyebolts 94 (FIGS. 2 and 7) are provided on the inner rod sections 46 of the arms 38, and when the backpack 74 is used as a seat, the clips 88 are attached to the eyebolts 94. The third suspension point for the sling type seat is formed when the loop strap 90 is placed around the top of the pole 4.

To assemble the portable tree stand 2, the hunter first removes the top pole section 8 with connected clamping assembly 32 from the backpack 72. Then, he rotates the inner rod sections 46 of the arms 38 until the arms 38 are perpendicular to the pole section 8. He also slides the outer rod sections 50 to extend the arms 38 to their maximum lengths. When that is completed, he removes the other pole sections 6 from the backpack 72 and connects all the pole sections together in their proper order. Then, the spike 70 at the bottom end of the pole 4 is removed from its storage position of FIG. 13 and put back in its use position of FIG. 14. The rope 54 is checked to insure that its end is properly secured to one of the arms 38 and threaded through the pulleys 58 and 60. Then, the hunter threads the other end of the rope 54 between the cam wheel 64 and abutment 66 of the rope clamp 62. That completes the assembly of the tree stand 2.

To secure the tree stand 2 to a tree trunk T (FIG. 5), the hunter raises the pole 4 to a vertical position next to the tree and manipulates the stand 2 until the arms 38 of the clamping assembly 32 encircle the trunk T, as shown in FIG. 6. He then pulls upwardly on the end of the rope 54 that has been threaded through the rope clamp 62, to begin rotating the arms 38 together. At the same time, he pulls downwardly on the pole 4 to force the spike 70 into the ground. When the arms 38 have been secured tightly against the trunk T, he rotates the handle 68 of the rope clamp 62 to secure the rope 54 and hold the arms 38 in place. The tree stand 2 is now secured to the tree trunk T and is ready for the hunter to begin climbing the pole 4.

Figure 16:
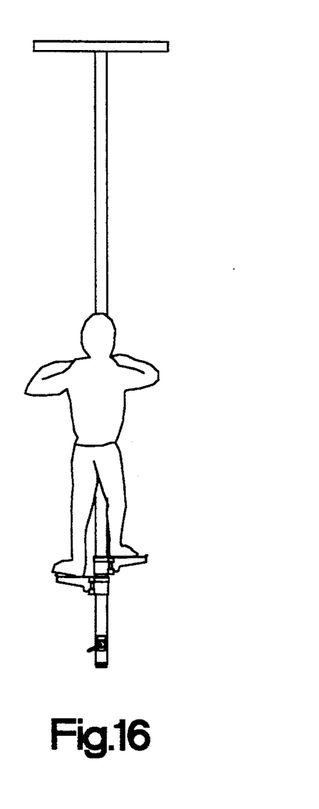
FIGS. 16 through 24 are views of the tree stand of FIG. 1, showing a user climbing the stand, preparing the seat at the top of the stand, and positioning himself in the seat at the top of the stand.
Figure 17:
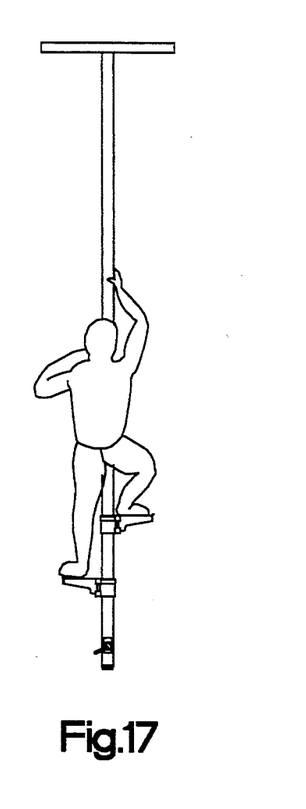
Figure 18:
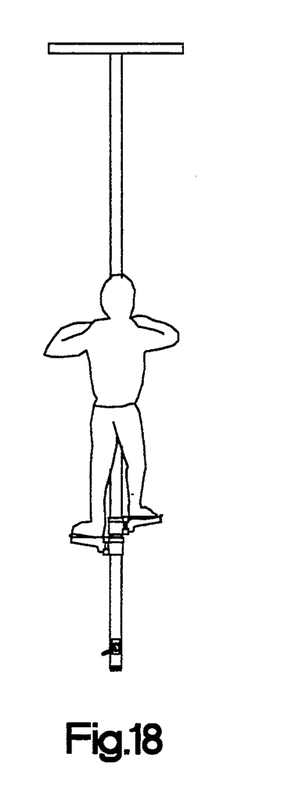

The hunter climbs the pole 4 using the foot supports 14 and 16. Facing the pole 4, with the pole 4 between himself and the tree, as shown in FIG. 6, he grasps the straps 30 connected to the foot supports 14 and 16, with the loops on the ends of the straps 30 extending around his hands. Then he steps onto the foot platforms 20 of the supports 14 and 16 and goes through a mounting procedure illustrated in FIGS. 16–18. Because the hunter's body is at all times on the outside of the pole 4, he creates a moment about the bottom of the pole that pulls the tines 52 of the arms 38 even more tightly against the back side of the trunk T, thus maintaining the stability of the stand 2 during the climbing and descending processes. To begin the climbing process, the hunter stands on the supports 14 and 16, as shown in FIG. 16, and then shifts his weight entirely to his left foot and raises both his right hand and right foot in a synchronous motion. The strap 30 attached to his right hand thus lifts right support 14, releasing the grip of the support's friction pads 26 and 28 on the pole 4 and maintaining the foot support in contact with the bottom of the hunter's right foot, as shown in FIG. 17. When he has raised his right foot to a comfortable height, the hunter shifts his weight from his left foot to his right foot, thereby pressing down on the foot support 14 and reapplying the grip of the supports friction pads 26 and 28 to the pole 4. Then, the hunter repeats the lifting procedure with his left hand and left foot to bring his left foot and associated foot support 16 to the position shown in FIG. 18. This procedure is continually repeated, always raising the right foot and foot support 14 first and then bringing the left foot and foot support 16 up to a position just beneath the foot support 14, until the hunter has reached the position shown in FIG. 19, with his waist at approximately the same elevation as the top of the pole 4.

Figure 19:
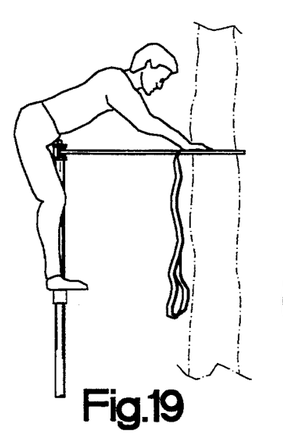

When the hunter reaches the position shown in FIG. 19, he attaches additional ropes or straps to secure the clamp arms 38 to the tree trunk T, so that the clamp arms 38 will be held securely to the tree trunk T independent of any tension in the rope 54. The reason for such additional securement is to allow the rope 54 to be loosened at a later time and used for a different purpose. The hunter then leans over the arms 38 and attaches the clips 88 on the backpack 74 to the eyebolts 94 on the inner rod sections 46 of arms 38.

If the hunter has left items on the ground, such as a weapon, that he could not carry on his back during his initial climb up the pole 4, he descends the pole 4, first taking his left foot off the foot support 16 and allowing the support 16 to drop slowly while hanging on to the strap 30 connected to the support 16. When the foot support 16 has dropped a comfortable distance, the hunter steps it, allowing his weight to force the friction pads 26 and 28 of the support 16 into engagement with the pole 4. Then, he repeats this process with his right foot and the foot support 14. The hunter repeats the process with his feet and foot supports 14 and 16 until he has descended to the bottom of the pole 4.

Figure 20:
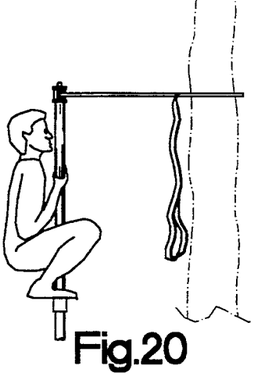
Figure 21:
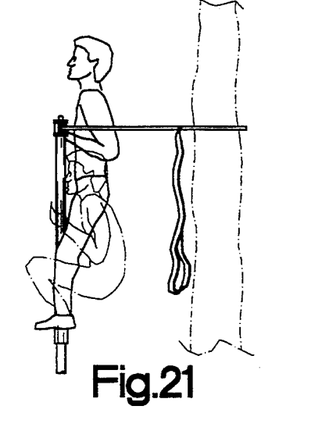
Figure 22:
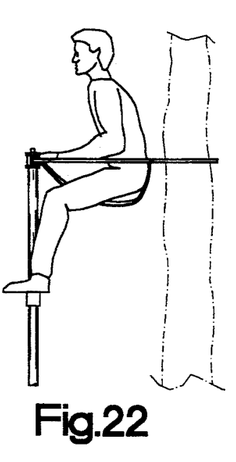
Figure 23:
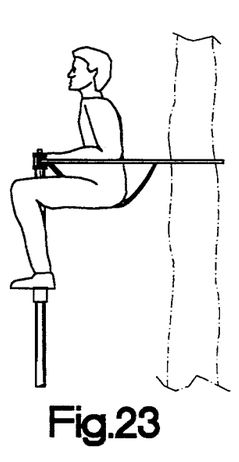
Figure 24:
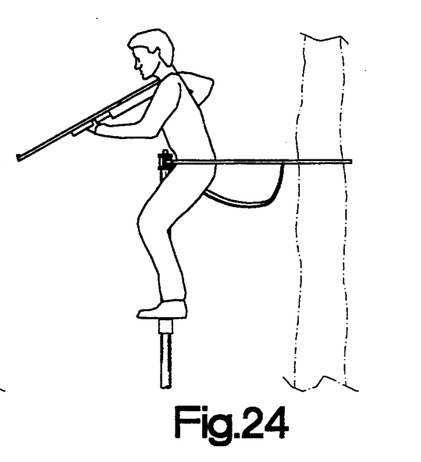

After reaching the ground, the hunter disconnects the rope 54 from the rope clamp 62 and ties his weapon or other peraphernalia to the end of the rope. Then, he climbs back up the pole 4, using the procedure previously explained and shown in FIGS. 16–18. On this ascent, he stops with his waist six to ten inches below the top of the pole 4. Then, he crouches down as shown in FIG. 20 and swings around the pole 4 to the dotted line position shown in FIG. 21. From there, he rises up from his crouch position to the solid line position shown in FIG. 21. Then, he places the loop strap 90 over the top end of the pole 4, as shown in FIG. 22 and sits in the sling type seat formed by the backpack 74, as shown in FIG. 23. Whenever he desires, he may rise from his seat to point a weapon or a viewing instrument, as shown in FIG. 24.

When the hunter desires, he reverses the procedure shown in FIGS. 20 to 24. First, he lowers his weapon to the ground, using the rope 54. Then he climbs down the pole 4, using the procedure described above for retrieving his weapon prior to sitting in the tree stand 2. Once on the ground, he removes his weapon from the rope 54 and secures the rope to the rope clamp 62. (FIGS. 11 and 12) While securing the rope to the rope clamp, he pulls the rope tightly to insure that the arms 38 of the clamping assembly 32 are held tight against the tree trunk T. Then, the hunter climbs back up the pole 4 and unties the ropes or straps that additionally secure the arms 38 to the tree trunk T. After climbing down the pole 4 again, the hunter releases the rope 54 from the rope clamp 62, which in turn releases the arms 38 from the tree trunk T. It may be necessary for the hunter to rotate the pole 4 back and forth to cause the arms 38 to spring open.

When the arms 38 have been separated from the tree trunk T, the hunter pulls the pole 4 backwardly. If he intends to move the tree stand 2 more than a short distance, he lays it on the ground, disconnects the pole sections 6 and 8 and puts them back in the backpack 74.

The portable tree stand 2 thus embodies several novel features that provide a combination of advantages not present in previously known tree stands. First, the foot supports 14 and 16, with their friction-padded sleeves, enable the hunter or other user to climb the stand quickly, if desired, and to take whatever size steps that are comfortable for him. The process of climbing and descending the stand with these foot supports requires little more exertion than climbing a set of steps. Secondly, the clamping assembly 32, with its light-weight arms that surround and attach to a tree trunk by the simple pull of a rope, provides a tree stand attachment that is very secure when the hunter climbs on the outside of the pole 4, creating an outward moment that causes the tines 52 to grip the other side of the tree evermore tightly. Thirdly, the three-point, sling seat provided by the backpack 74 gives the hunter a secure, comfortable place to sit. In this seat, the hunter is surrounded by clamping arms 38 that act as a safety cage, arm rest and a rest for a gun or cross bow. Furthermore, this safety cage is not an add-on item that adds weight to the stand, but is an integral part of the clamping assembly of the tree stand 2. From his seated position, the hunter can twist, turn and even stand, as shown in FIG. 24. In addition, the tree stand 2 may be secured to trees having either single or double trunks of a wide variety of shapes and sizes.

While one embodiment of the present invention has been shown and described, other embodiments and modifications will be apparent to those skilled in the art, without departing from the spirit of the invention, as defined by the appended claims.

I claim:

1. Apparatus for use by a person to climb to and descend from an elevated position next to an upright object, comprising:
   (a) a tubular metal pole having top and bottom ends;
   (b) a clamping assembly attached to the pole near the top end for securing the pole to the upright object;
   (c) a device on the bottom end of the pole for anchoring said bottom end to the ground; and
   (d) upper and lower foot supports for use by the person to climb and descend the pole, each of the foot supports comprising a sleeve slidably mounted on the pole and a foot platform extending from one side of the sleeve, the sleeve of the upper foot support being mounted on the pole above the sleeve of the lower foot support, each sleeve having upper and lower friction pads on its interior surface facing said pole, the upper friction pad being located on the side of said sleeve opposite from said foot platform and the lower friction pad being located on the same side of said sleeve as said foot platform, said friction pads having friction surfaces engageable with the outer surface of said pole and holding the foot support in a fixed position on the pole in response to a downwardly applied force on the foot support.

2. The apparatus according to claim 1 also comprising:
   (e) a strap connected to the side of each foot support on which the foot platform is located, for pulling up on the foot support to disengage the friction pads from the pole and allow the sleeve to slide on the pole.

3. The apparatus according to claim 1 wherein the clamping assembly (b) comprises two arms extending outwardly from the pole and mounted rotatably on the pole about an axis substantially parallel to the pole, a tine extending from the distal end of each arm in a direction substantially perpendicular to the pole and toward the tine on the other arm, and a rope having one end secured to one of said arms at a location between the pole and the distal end of the arm, the rope being slidably connected to the other of said arms at a location between the pole and the distal end of the arm, so that a pulling force on the other end of the rope rotates said arms toward each other and causes the tines to come together, thereby securing the pole to the upright object when the object is located within an enclosure formed by the arms, the tines and the portion of the rope extending between the arms.

4. The apparatus according to claim 3 wherein the clamping assembly (b) also comprises a rope clamp mounted on the pole for securing said rope after the arms have been rotated toward each other to secure the top of the pole to the upright object.

5. The apparatus according to claim 3 wherein each of the arms of the clamping assembly (b) comprises a plurality of telescoping sections that are adjustable to allow the arm to be collapsed for storage or carrying purposes.

6. The apparatus according to claim 3 wherein the arms of the clamping assembly (b) are also mounted rotatably on the pole about axes substantially perpendicular to the pole so that the arms can be rotated to positions parallel to the pole for storage or carrying purposes.

7. The apparatus according to claim 3 further comprising:
   (e) a sling for holding a person seated between the arms of the clamping assembly (b), the sling having two attachment devices each connectable to an arm of the clamping assembly (b) at a location between the pole and the distal end of the arm and a third attachment device connectable to the top end of the pole.

8. Apparatus for use by a person to climb to and descend from an elevated position next to an upright object, comprising:
   (a) a pole having top and bottom ends;
   (b) a device on the bottom end of the pole for anchoring said bottom end to the ground;
   (c) a clamping assembly attached to the pole near the top end for securing the pole to the upright object, the clamping assembly comprising two arms extending outwardly from the pole and engageable with the side of the upright object opposite from the pole to limit the rotation of the pole about the anchoring device (c) and away from the upright object when the person climbs or descends the pole with his body on the side of the pole away from the upright object; the two arms of the clamping assembly being mounted rotatably on the pole about an axis substantially parallel to the pole and the clamping assembly further comprises a tine extending from the distal end of each arm in a direction substantially perpendicular to the pole and toward the tine on the other arm, and a rope having one end secured to one of said arms at a location between the pole and the distal end of the arm, the rope being slidably connected to the other of said arms at a location between the pole and the distal end of the arm, so that a pulling force on the other end of the rope rotates said arms toward each other and cause the tines to come together, thereby securing the pole to the upright object when the object is located within an enclosure formed by the arms, the tines and the portion of the rope extending between the arms and (d) upper and lower foot supports for use by the person to climb and descend the pole, each of the foot supports being slidably mounted on the pole and a having friction assembly that holds the foot support in a fixed position on the pole in response to a downwardly applied force on the foot support.

9. The apparatus according to claim 8 wherein the clamping assembly (b) also comprises a rope clamp mounted on the pole for securing the rope after the arms have been rotated toward each other to secure the pole to the upright object.

10. The apparatus according to claim 8 wherein each of the arms of the clamping assembly (b) comprises a plurality of telescoping sections that are adjustable to allow the arm to be collapsed for storage or carrying purposes.

11. The apparatus according to claim 8 wherein the arms of the clamping assembly (b) are also mounted rotatably on the pole about axes substantially perpendicular to the pole, so that the arms can be rotated to positions parallel to the pole for storage or carrying purposes.

12. The apparatus according to claim 8 further comprising:

(e) a sling for holding a person seated between the arms of the clamping assembly (b), the sling having two attachment devices each connectable to an arm of the clamping assembly (b) at a location between the pole and the distal end of the arm and a third attachment device connectable to the top end of the pole.

13. The apparatus according to claim 8 further comprising:

(e) a telescopable pole-covering sock connected at one end to the sleeve of the lower foot support and at the other end to the pole a location near the bottom end of the pole.

14. The apparatus according to claim 8 wherein each of the arms of the clamping assembly (b) comprise a plurality of telescoping sections that are adjustable to vary the length of the arm and each arm is also mounted rotatably on the pole about an axis substantially perpendicular to the pole, so that the arms can be rotated to positions parallel to the pole for storage or carrying purposes.

15. The apparatus according to claim 14 further comprising:

(e) a sling for holding a person seated between the arms of the clamp assembly (b), the sling having two attachment devices each connectable to an arm of the clamping assembly (b) at a location between the pole and the distal end of the arm and a third attachment device connectable to the top end of the pole.

16. The apparatus according to claim 15 wherein the pole comprises pole sections made of metal tubes that are detachable from one another for storage or carrying purposes.

17. The apparatus according to claim 16 further comprising:

(e) a telescopable pole-covering sock connected at one end to the sleeve of the lower foot support and at the other end to the pole a location near the bottom end of the pole.

* * * * *